US012436592B2

(12) United States Patent
Roy (10) Patent No.: US 12,436,592 B2
(45) Date of Patent: Oct. 7, 2025

(54) LOW POWER LOW FREQUENCY COUNTER FOR SOFTWARE USE

(71) Applicant: Silicon Laboratories Inc., Austin, TX (US)

(72) Inventor: Subrata Roy, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 71 days.

(21) Appl. No.: 18/321,058

(22) Filed: May 22, 2023

(65) Prior Publication Data

US 2024/0393857 A1    Nov. 28, 2024

(51) Int. Cl.
| | |
|---|---|
| G06F 1/324 | (2019.01) |
| G06F 1/04 | (2006.01) |
| G06F 1/06 | (2006.01) |
| G06F 1/08 | (2006.01) |
| G06F 1/14 | (2006.01) |
| G06F 1/3203 | (2019.01) |
| G06F 1/3237 | (2019.01) |
| G06F 1/3287 | (2019.01) |

(52) U.S. Cl.
CPC ............... *G06F 1/324* (2013.01); *G06F 1/08* (2013.01); *G06F 1/14* (2013.01); *G06F 1/04* (2013.01); *G06F 1/06* (2013.01); *G06F 1/3203* (2013.01); *G06F 1/3237* (2013.01); *G06F 1/3287* (2013.01)

(58) Field of Classification Search
CPC ...... G06F 1/3203; G06F 1/324; G06F 1/3287; G06F 1/08; G06F 1/3237; G06F 1/14; G06F 1/04; G06F 1/06
USPC .......................... 713/322, 323, 500, 501, 502
See application file for complete search history.

(56) References Cited

U.S. PATENT DOCUMENTS

| | | | | |
|---|---|---|---|---|
| 5,694,066 A | * | 12/1997 | Shyong ................. | H03K 23/68 327/299 |
| 6,453,181 B1 | * | 9/2002 | Challa ................ | H04W 52/029 455/574 |
| 10,172,092 B1 | * | 1/2019 | Zhou ........................ | G06F 1/08 |
| 11,496,234 B2 | | 11/2022 | Seethamraju | |
| 11,502,764 B2 | | 11/2022 | Sarda | |
| 11,526,193 B2 | | 12/2022 | Ranganathan et al. | |
| 2013/0015893 A1 | * | 1/2013 | Severson ............... | H03K 23/66 327/151 |

(Continued)

OTHER PUBLICATIONS

Silicon Laboratories Inc., "EFR32MG21 Mighty Gecko Multiprotocol Wireless SoC Family Data Sheet," Revision 1.1, Sep. 2019, 76 pages.

*Primary Examiner* — Ji H Bae
(74) *Attorney, Agent, or Firm* — Zagorin Cave LLP (57) ABSTRACT

A method updates a low frequency count value at a first frequency in an active mode and maintains the low frequency count value in the low power mode. Updating the low frequency count value includes updating a fractional counter in response to a first clock signal, updating an integral counter in response to a second clock signal, and generating the second clock signal based on the fractional count and the first clock signal. The first clock signal has a second frequency. The first frequency is lower than the second frequency. Updating the low frequency count value may include adjusting the low frequency count value in response to exiting the low power mode based on a difference between a current value of a real time clock counter and a prior value of the real time clock counter stored upon entry into the low power mode.

18 Claims, 4 Drawing Sheets

(56) References Cited

U.S. PATENT DOCUMENTS

| | | | |
|---|---|---|---|
| 2013/0159747 A1* | 6/2013 | Hughes | G06F 1/04 |
| | | | 713/322 |
| 2022/0164016 A1* | 5/2022 | Baeza | G06F 1/3237 |
| 2024/0302884 A1* | 9/2024 | Pedersen | G06F 1/14 |

* cited by examiner

LOW POWER LOW FREQUENCY COUNTER FOR SOFTWARE USE

BACKGROUND

Field of the Invention

This disclosure relates to integrated circuits in general, and more particularly to clock signals of integrated circuits.

Description of the Related Art

An exemplary integrated circuit product has an active mode of operation in which software executing on a processor reads a low frequency counter (e.g., a millisecond counter that increments each millisecond) that is generated based on a system counter that increments at a higher frequency (e.g., a 32.768 kHz counter) to generate a low frequency timer. Since a one millisecond time period is not integrally related to the time period of a 32.768 kHz signal, the software continuously performs a fractional division to convert between a 32.768 kHz counter value and a millisecond counter value, both when reading the counter value and when writing a comparison value for determining the next time to notify the software. The software conversion consumes instruction cycles and power and the computation time increases error in the millisecond count value. Accordingly, improved techniques for generating a low frequency count value using another counter having a non-integrally related update rate are desired.

SUMMARY OF EMBODIMENTS OF THE INVENTION

In at least one embodiment, a method for operating an integrated circuit device having a low power mode of operation and an active mode of operation includes updating a low frequency count value at a first frequency in the active mode and maintaining the low frequency count value in the low power mode. Updating the low frequency count value includes updating a fractional counter in response to a first clock signal, updating an integral counter in response to a second clock signal, and generating the second clock signal based on the fractional count and the first clock signal. The first clock signal has a second frequency. The first frequency is lower than the second frequency. Updating the low frequency count value may include adjusting the low frequency count value in response to exiting the low power mode based on a difference between a current value of a real time clock counter and a prior value of the real time clock counter stored upon entry into the low power mode.

In at least one embodiment, an integrated circuit product includes a low frequency counter configured to update a low frequency count value at a first frequency in an active mode of the integrated circuit product. The low frequency counter is configured to maintain the low frequency count value in a low power mode of the integrated circuit product. The low frequency counter includes a fractional counter configured to update a fractional count in response to a first clock signal. The low frequency counter includes an integral counter configured to update an integral count in response to a second clock signal. The low frequency counter includes control logic configured to generate the second clock signal based on the fractional count and the first clock signal. The first clock signal has a second frequency. The first frequency is lower than the second frequency. The low frequency counter may adjust the low frequency count value in response to exiting the low power mode based on a difference between a current value of a real time clock counter and a prior value of the real time clock counter stored upon entry into the low power mode by the integrated circuit product. The low frequency counter may include a fractional increment adjustment circuit configured to update the fractional counter in response to exiting the low power mode using the fractional count, a first predetermined amount, a modulus value, and the difference. The low frequency counter may include an integral increment adjustment circuit configured to update the integral count in response to exiting the low power mode using the integral count, a second predetermined amount, a divisor value, and the difference.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
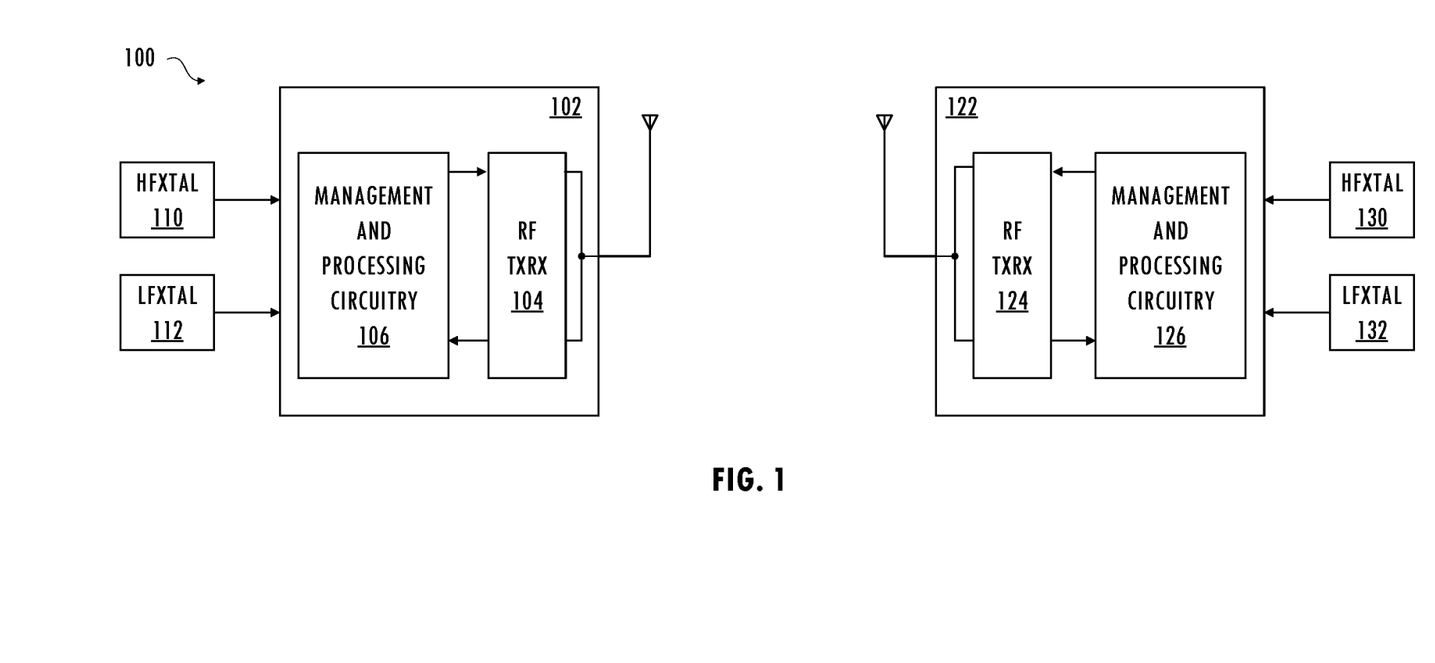
FIG. 1 illustrates a functional block diagram of an exemplary wireless communications system having an active mode of operation and a low power mode of operation.

Referring to FIG. 1, wireless communications system 100 includes wireless communications device 102, which includes radio frequency transceiver 104 and management and processing circuitry 106, and wireless communications device 122, which includes radio frequency transceiver 124 and management and processing circuitry 126. In at least one embodiment, wireless communications device 102 or wireless communications device 122 is an integrated circuit product including a low power, low frequency counter that is updated every millisecond (i.e., at a rate of 1 kHz) based on another counter value having a non-integrally related, higher frequency update rate. High frequency crystal 110 (e.g., a 38.4 MHz crystal) and low frequency crystal 112 (e.g., a 32.768 kHz crystal) are configured to provide periodic signals used by wireless communications device 102 and high frequency crystal 130 and low frequency crystal 132 and are used to provide periodic signals used by wireless communications device 122.

In at least one embodiment, wireless communications system 100 is compliant with the Bluetooth® Low Energy (BLE) standardized communications protocol designed for low power and low latency applications. However, in other embodiments, wireless communications system 100 is compliant with other wireless communications protocols (e.g., Bluetooth Classic, IEEE 802.15.4 based protocols, or other radio frequency protocol standards). In an embodiment of wireless communications system 100, to communicate with each other, wireless communications device 102 sends advertisement packets to wireless communications device 122 while wireless communications device 122 scans for advertisement packets using the same channel. Wireless communications device 122 discovers wireless communications device 102 and reads the advertisement packet and information for establishing a connection. Wireless communications device 122 sends a connection request packet, which is received by the wireless communications device 102 and triggers creation of a connection between the two wireless communications devices. In an exemplary communications sequence, receipt of a packet by wireless communications device 122 from wireless communications device 102 establishes a connection and wireless communications device 122 becomes known as a master device and wireless communications device 102 becomes known as the slave device. As the master device, wireless communications device 122 is responsible for managing the connection, controlling connection parameters, and the timing of the different events within a connection.

Figure 2:
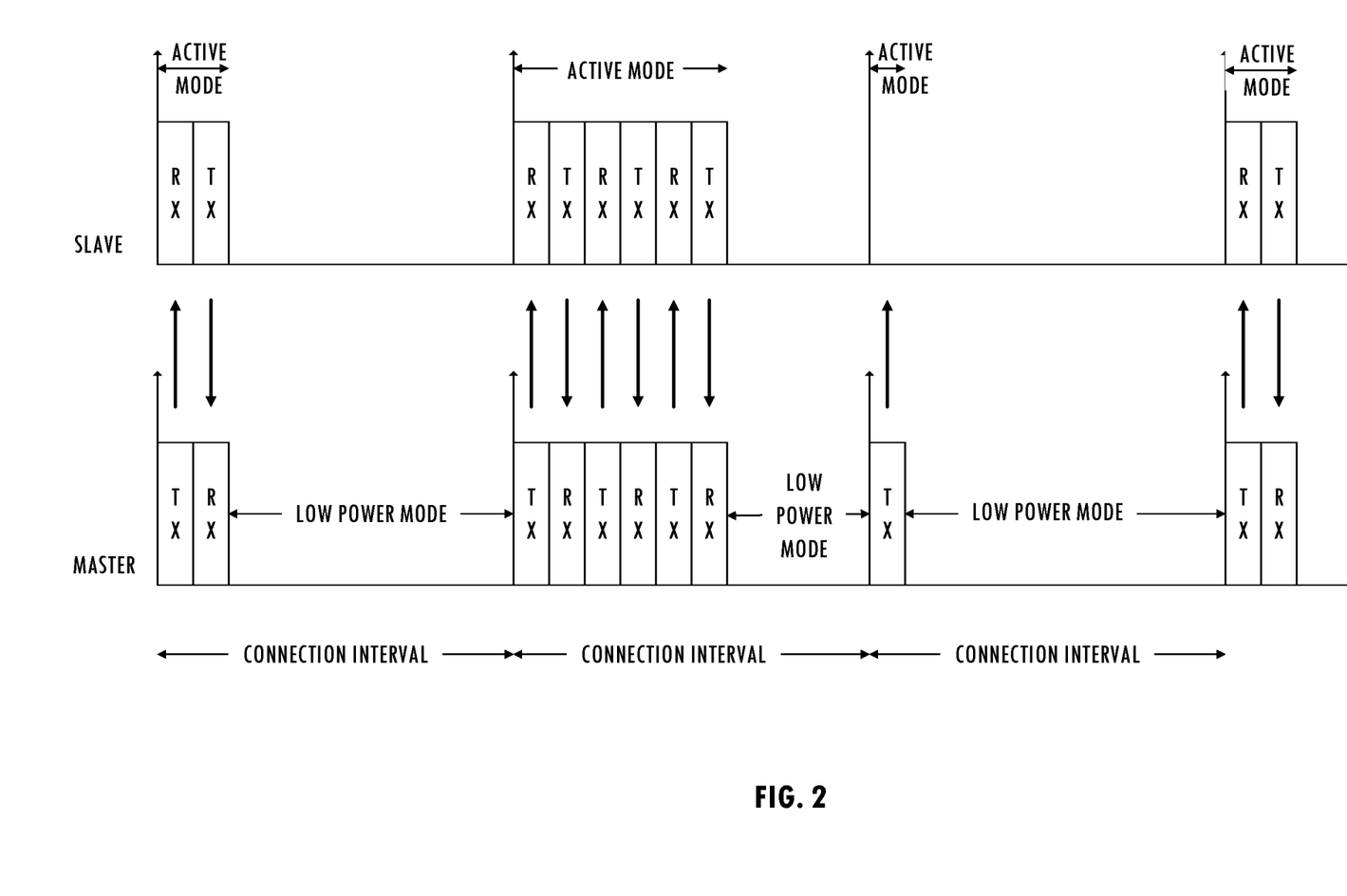
FIG. 2 illustrates exemplary operations of wireless communications devices of the wireless communications system of FIG. 1.

Referring to FIGS. 1 and 2, in an active mode of operation, during an exemplary connection event, wireless communications device 122 and wireless communications device 102 alternate sending data packets to each other until neither side has data to send. A connection event includes at least one packet sent by the master device (e.g., wireless communications device 122). The slave device (e.g., wireless communications device 102) returns a packet if it received a packet from the master device. If wireless communications device 122 does not receive a packet back from wireless communications device 102, then wireless communications device 122 closes the connection event and resumes sending packets during the next connection event. When not communicating data packets, the master and the slave enter a low power mode of operation to conserve energy. The starting points of consecutive connection events are spaced by a period called a connection interval (e.g., an interval in the range of 7.5 ms to 4000 ms).

Figure 3:
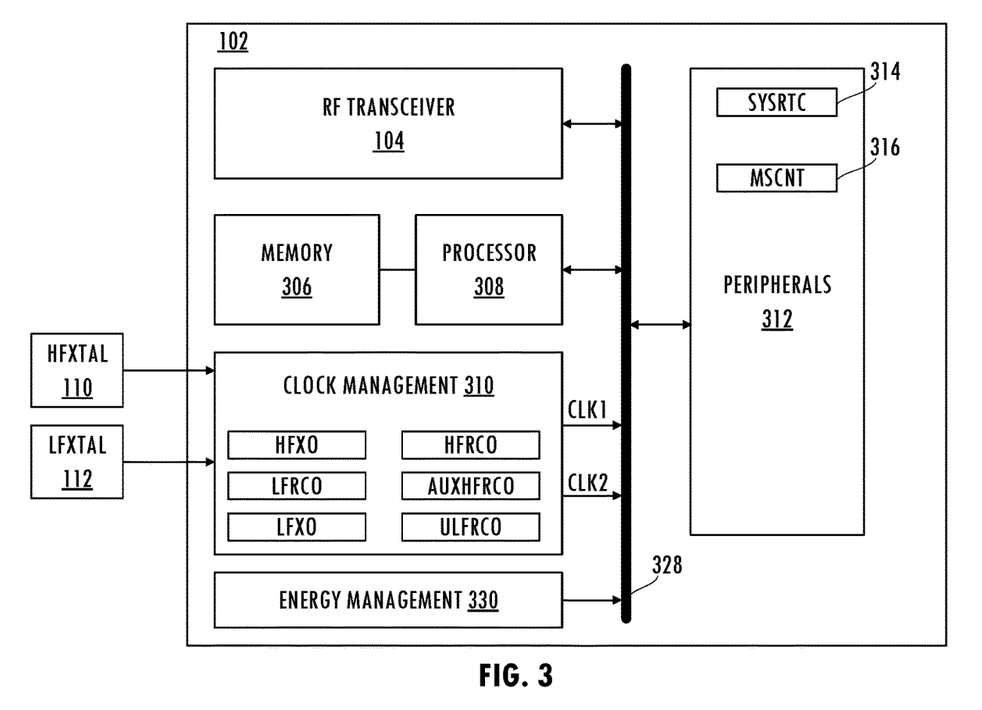
FIG. 3 illustrates a functional block diagram of an exemplary wireless communications device of the wireless communications system of FIG. 1.

Referring to FIG. 3, in at least one embodiment, wireless communications device 102 includes a radio frequency transceiver 104, processor 308, memory 306, clock management circuit 310, buses 328, and peripherals 312. Clock management circuit 310 controls enablement and configuration of oscillators and clock signals based on high frequency crystal 110, low frequency crystal 112, and internal RC oscillator circuits. In an embodiment, clock management circuit 310 individually enables or disables clock signals provided to the peripherals, e.g., based on a current energy state of wireless communications device 102. Selective enabling of oscillators and clock signals, which may be controlled by clock management circuit 310, facilitates management of system energy consumption.

In at least one embodiment of wireless communications device 102, energy management circuit 330 includes a finite state machine configured to manage the energy state of wireless communications device 102 to conserve energy. In at least one embodiment, energy management circuit 330 configures wireless communications device 102 in one of various modes of operation including an active mode in which processor 308 is operational (e.g., executing software, i.e., instructions stored in memory 306) and at least one low power mode in which processor 308 is not active and not executing software, and that consumes less energy than the active mode (e.g., a sleep mode, a deep sleep mode, a stop mode, a hibernate mode, or a shutoff mode). For example, energy management circuit 330 configures wireless communications device 102 in an active mode, a deep sleep mode, sleep mode, stop mode, hibernate mode, or a shutoff mode. In an active mode, processor 308 executes instructions retrieved from memory 306 using a high frequency clock signal or RF transceiver 104 communicates using the high frequency clock signal. In a sleep mode, processor 308 is inactive, but RF transceiver 104 is active and communicates using a high frequency clock signal. In deep sleep mode, processor 308 is inactive and RF transceiver 104 is inactive but wireless communications device 102 scans, advertises, or is in connection. In at least one embodiment, in deep sleep mode, at least one low power function (e.g., a 32 kHz timer) is still active. In stop mode, hibernate mode, and shutoff mode, wireless communication device 102 has no wireless communications connection. In deep sleep mode, stop mode, and hibernate mode, a low frequency clock signal is active and the high frequency clock signal is inactive.

At least some of the low power modes operate using a low frequency clock signal generated based on a signal received from a low frequency crystal oscillator (LFXO), a low frequency RC oscillator (LFRCO), precision low frequency RC oscillator (PLFRCO), or other low frequency oscillator. Required accuracy of the low frequency clock signal depends on the operating mode of wireless communications. For example, when advertising or scanning (e.g., in a deep sleep power state), accuracy is not critical to functionality. However, when a connection is open, the accuracy must be at least +/−500 ppm. This clock can be implemented either by a LFXO (having higher accuracy) or a PLFRCO or LFRCO (having lower accuracy) depending on the accuracy requirements. In at least one embodiment, the low frequency clock source has a frequency in the range of 32.768 kHz+/− 500 ppm and is used for sleep timing. In general, a 32.768 kHz clock signal is used because it is a power of 2 (215) and a 15-stage binary counter controlled by a 32.768 kHz clock generates a precise 1 second period (1 Hz frequency) clock signal. Another mode, e.g., an active mode or data transfer mode, uses a high frequency clock signal based on a high frequency crystal oscillator. For example, in the active mode of operating wireless communications device 102, energy management circuit 330 configures clock management circuit 310 to provide a high frequency clock signal (e.g., generated using HFXO or HFRCO) to enable processor 308, RF transceiver 104, or a high frequency peripheral.

In at least one embodiment, peripherals 312 communicate with each other, energy management circuit 330, RF transceiver 104, or clock management circuit 310 via buses 328, independently from software executing on processor 308 and further facilitates management of system energy consumption. A producer peripheral of peripherals 312 generates a signal that is routed by buses 328 to a consumer peripheral of peripherals 312. In an embodiment, each peripheral of peripherals 312 has a predetermined address range for memory-mapped access and programming.

In at least one embodiment, peripherals 312 includes system real-time counter 314 and millisecond counter 316. In at least one embodiment, system real-time counter 314 is a general purpose real-time clock running in all energy modes except shutoff, using a low frequency clock, e.g., a 32.768 kHz clock signal. In an embodiment, system real-time counter 314 is a multi-bit counter (e.g., 32-bit counter) that is available in all energy modes except shutoff. In an embodiment, millisecond counter 316 is a separate counter that advances at an average rate of 125/4096 of the 32.768 kHz clock signal driving system real-time clock 314. In an embodiment, millisecond counter 316 is used to generate 1 ms (i.e., 1 kHz) tick for a sleep timer software component and is only used during an active mode of operation by software but is maintained through the low power mode of operation without any software intervention. In an embodiment of wireless communications device 102, an application programming interface (API) call reads millisecond counter 316 and uses it in software routines. For example, API millisecond_counter get( ) returns a current value of millisecond counter 316. Drivers of peripherals receiving the millisecond counter value use that value. However, an error in the millisecond counter value can degrade performance of the corresponding wireless communications system.

In a low power mode of operation of wireless communications device 102, millisecond counter 316 is unused and disabled to conserve energy. Although millisecond counter 316 does not update during the low power mode, millisecond counter 316 maintains its state and receives an updated state and resumes incrementing upon exiting the low power mode. Techniques to maintain the low frequency count across the power saving mode stores a current remainder of the conversion upon entry into the power saving mode. However, this technique does not accumulate error across the duration of the interval in the power saving mode. When the integrated circuit product exits the low power mode and resumes operation, an error due to the fractional conversion error accumulated over the time in the low power mode is introduced into low frequency timer.

Figure 4:
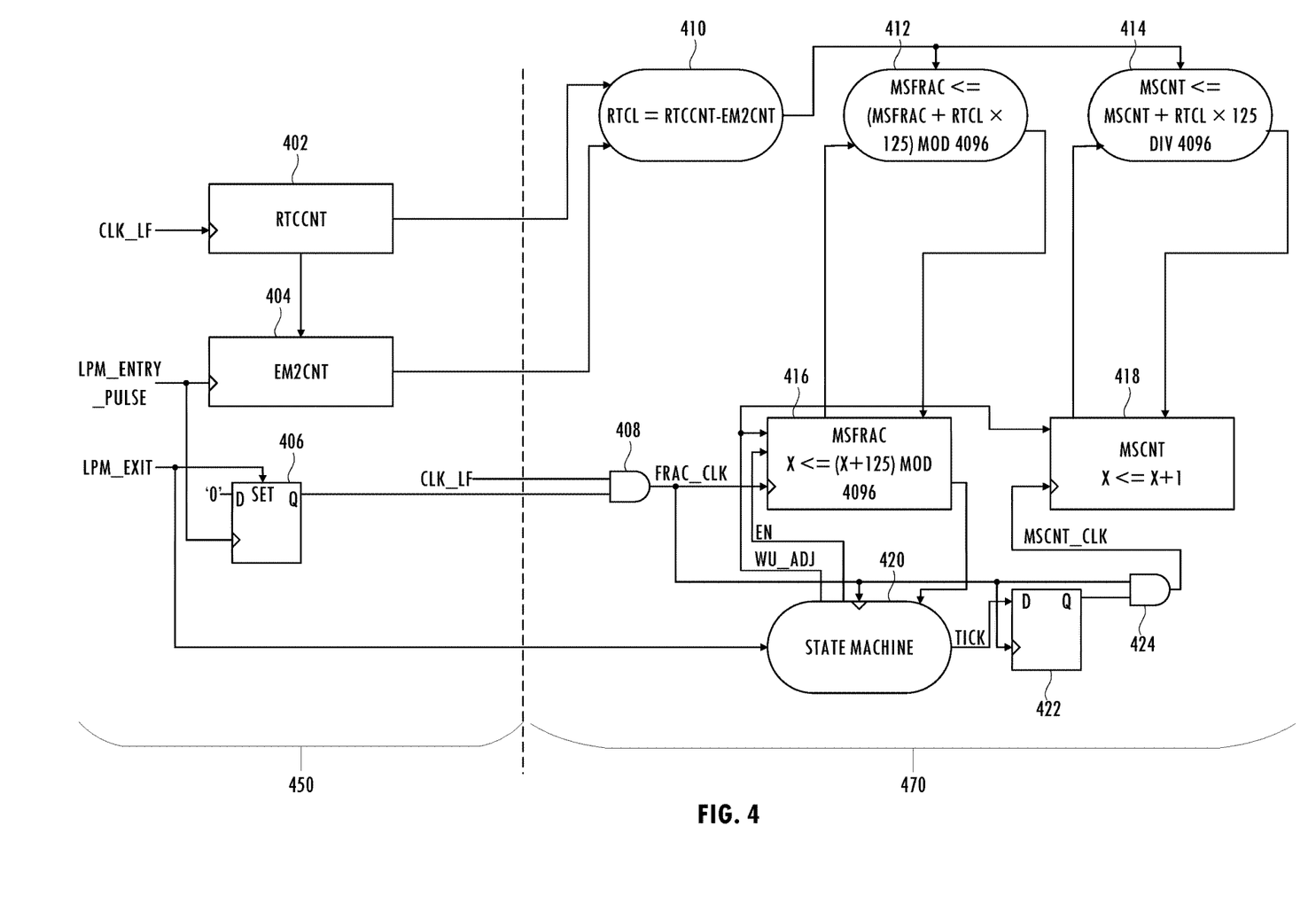
FIG. 4 illustrates a functional block diagram of an embodiment of a low power millisecond counter of the wireless communications device of FIG. 3 consistent with at least one embodiment of the invention.

Referring to FIGS. 3 and 4, in at least one embodiment, a technique for providing a low power millisecond counter with low jitter implements millisecond counter 316 including circuit portion 450, which is on in the active mode of operation and the low power mode. Millisecond counter 316 also includes circuit portion 470, which is enabled only in the active mode of operation (i.e., is disabled in the low power mode). In at least one embodiment, real-time clock counter 402 increments with each period of low frequency clock signal CLK_LF (e.g., a clock signal generated base on low frequency crystal 112). In response to a change of operational state of wireless communications device 102, energy management circuit 330 configures wireless communication device 102 in the low power mode and generates a pulse on control signal LPM_ENTRY_PULSE to indicate entry into the low power mode. In at least one embodiment, register EM2CNT 404 captures the contents of real-time clock counter 402 upon entry into the low power mode. In addition, control signal LPM_ENTRY_PULSE causes state element 406 to store a predetermined value (e.g., '0', i.e., clears state element 406) to indicate that the system is configured in the low power mode.

In an embodiment of wireless communication device 102, to return to the active mode, energy management circuit 330 asserts control signal LPM_EXIT, which sets state element 406, thereby enabling circuit 470 in the active mode. Accordingly, logic gate 408 enables clock signal FRAC_CLK, which is a version of low frequency clock signal CLK_LF, gated with the output of state element 406 and state machine 420 generates enable signal EN that has an active level while the integrated circuit product is in the active mode and has an inactive level while the integrated circuit product is in a low power mode.

In an embodiment of circuit 470, circuit 410 computes difference RTCL, which is the difference between a current value of real-time clock counter 402 and a prior value of real-time clock counter 402 stored by register EM2CNT 404 upon entry into the low power mode. Difference RTCL is used to provide a wake-up adjustment for the number of ticks of real-time clock counter 402 that occurred while the integrated circuit product was in the low power mode and circuit 470 is disabled. In at least one embodiment, circuit 412 uses that difference to compute a fractional wake-up adjustment value and circuit 414 uses difference RTCL to compute an integral wake-up adjustment value. For example, circuit 412 computes modulo 4096 of the sum of fractional value MSFRAC at entry into the low power mode and 125 times difference RTCL (i.e., MSFRAC<= (MSFRAC+RTCL×125) mod 4096) and circuit 414 computes the sum of fractionalintegral value MSCNT at entry into the low power mode and 125 times the difference RTCL (i.e., MSCNT<=(MSCNT+RTCL×125) divided by 4096. Fractional counter 416 and integral counter 418 load corresponding wake-up adjustment values provided by circuit 412 and circuit 414, respectively, in response to a pulse on WU_ADJ generated by state machine 420 upon exit from the low power mode. By the time software executing on a processor of the integrated circuit product wakes up, fractional counter 416 and integral counter 418 are up to date.

After exiting the low power mode and establishing a steady-state active mode of operation, clock control signal FRAC_CLK and clock control signal MSCNT_CLK increment fractional counter 416 and integral counter 418, respectively, at different rates. Clock control signal FRAC_CLK is a gated version of low frequency clock signal CLK_LF. In the active mode, fractional counter 416 is a modulo counter that updates by incrementing a current value by a first predetermined value (e.g., 125) and computing the remainder of division of the incremented value by a second predetermined value (e.g., 4096). State machine 420 asserts control signal TICK when the value of fractional counter 416 is close to the divider value (e.g., within +/−62 of 4096). The difference between the value of fractional counter 416 and the second predetermined value (e.g., 4096) is the amount of error in control signal TICK. State element 422 synchronizes the logic level of control signal TICK with an edge of clock control signal FRAC_CLK. Logic circuit 424 synchronizes the output of state element 422 with clock control signal FRAC_CLK to generate clock control signal MSCNT_CLK. As a result, clock control signal MSCNT_CLK causes integral counter 418 to increment at an average rate of 125/4096 of the 32768 Hz clock with a jitter limited to #1.6% over a 125 ms interval.

While in the active mode, integral counter 418 increments in response to clock signal MSCNT_CLK, which is generated based on the value of fractional counter 416. By adjusting fractional counter 416 and integral counter 418 to account for the period in which the integrated circuit product is in the low power mode, integral counter 418 and fractional counter 416 can be disabled during the low power mode without accumulating error in the millisecond counter and a continuous time conversion is not needed. Accordingly, the millisecond counter can be disabled in the low power mode. Software can interact with the millisecond counter in the active mode of operation and not consume software cycles for a conversion of the 32.768 kHz clock signal. By using fractional counter 416 and adjusting fractional counter 416 and integral counter 418 to account for the period in which the integrated circuit product is in the low power mode and circuit 470 is disabled, error does not accumulate across long periods of low power mode operation. In at least one embodiment, software executing on processor 308 using the integral counter reads the integral counter 418 when exiting the sleep mode and processor 308 enters an active mode, e.g., in response to a timer or other trigger. Processor 308 reads the value of the millisecond counter, which appears to having been continually ticking.

Thus, techniques for providing a low power, low frequency counter with reduced jitter have been described. Software interacts with the millisecond timer in units of milliseconds with a jitter limited to +1.6% over a 125 ms interval and does not need time or processing cycles for conversion from a 32.768 kHz clock signal. Structures described herein may be implemented using software executing on a processor (which includes firmware) or by a combination of software and hardware.

The description of the invention set forth herein is illustrative and is not intended to limit the scope of the invention as set forth in the following claims. For example, while the invention has been described in an embodiment using a 32.768 kHz crystal and generating a 1 ms counter, one of skill in the art will appreciate that the teachings herein can be utilized with other timing signals or relationships. The terms "first," "second," "third," and so forth, as used in the claims, unless otherwise clear by context, is to distinguish between different items in the claims and does not otherwise indicate or imply any order in time, location or quality. For example, "a first received signal," "a second received signal," does not indicate or imply that the first received signal occurs in time before the second received signal. Variations and modifications of the embodiments disclosed herein may be made based on the description set forth herein, without departing from the scope of the invention as set forth in the following claims.

What is claimed is:

1. A method for operating an integrated circuit device having a low power mode of operation and an active mode of operation, the method comprising:
    updating a low frequency count value in the active mode and maintaining the low frequency count value at a fixed value in the low power mode,
    wherein in the active mode, the low frequency count value is updated at a rate equal to a first frequency, and
    wherein updating the low frequency count value comprises:
        updating a fractional count in response to a first clock signal;
        updating an integral count in response to a second clock signal;
        generating the second clock signal based on the fractional count and the first clock signal; and
        adjusting the low frequency count value in response to exiting the low power mode and based on a difference between a current value of a real time clock counter and a prior value of the real time clock counter stored upon entry into the low power mode,
        wherein the second clock signal causes the integral count to update at an average rate equal to the first frequency, and
    wherein the first clock signal has a second frequency, the first frequency being lower than the second frequency.

2. The method as recited in claim 1 wherein adjusting the low frequency count value updates the fractional count using the fractional count, a first predetermined amount, a modulus value, and the difference.

3. The method as recited in claim 1 wherein adjusting the low frequency count value updates the integral count using the integral count, a second predetermined amount, a divisor value, and the difference.

4. The method as recited in claim 1 wherein updating the low frequency count value includes generating a low frequency counter enable signal based on a low power state entry signal and a low power state exit signal.

5. The method as recited in claim 1 wherein the second frequency is non-integrally related to the first frequency.

6. The method as recited in claim 1 further comprising: executing instructions to read the integral count in the active mode.

7. The method as recited in claim 1 wherein the first frequency is 1 kHz and the second frequency is 32.768 kHz.

8. The method as recited in claim 1 wherein the second clock signal has an active level in response to the fractional count being in a range of values around a predetermined value.

9. An integrated circuit product comprising:
    a low frequency counter configured to update a low frequency count value in an active mode of the integrated circuit product and configured to maintain the low frequency count value at a fixed value in a low power mode of the integrated circuit product, the low frequency counter comprising:
        a fractional counter configured to update a fractional count in response to a first clock signal;
        an integral counter configured to update an integral count in response to a second clock signal; and
        control logic configured to generate the second clock signal based on the fractional count and the first clock signal,
    wherein in the active mode, the second clock signal causes the integral counter to update at an average rate equal to a first frequency,
    wherein the low frequency counter adjusts the low frequency count value in response to exiting the low power mode and based on a difference between a current value of a real time clock counter and a prior value of the real time clock counter stored upon entry into the low power mode by the integrated circuit product,
    wherein in the active mode, the low frequency count value is updated at a rate equal to the first frequency, and
    wherein the first clock signal has a second frequency, the first frequency being lower than the second frequency.

10. The integrated circuit product as recited in claim 9 further comprising:
    a fractional increment adjustment circuit configured to update the fractional count in response to exiting the low power mode and based on the fractional count, a first predetermined amount, a modulus value, and the difference.

11. The integrated circuit product as recited in claim 9, further comprising:
    an integral increment adjustment circuit configured to update the integral count in response to exiting the low power mode and based on the integral count, a second predetermined amount, a divisor value, and the difference.

12. The integrated circuit product as recited in claim 9 further comprising:
    a control circuit configured to generate a low frequency counter enable signal based on a low power state entry signal and a low power state exit signal.

13. The integrated circuit product as recited in claim 9 wherein the second frequency is non-integrally related to the first frequency.

14. The integrated circuit product as recited in claim 9 further comprising:
    a memory circuit; and
    a processor configured to execute instructions stored in the memory circuit to read the integral counter in the active mode.

15. The integrated circuit product as recited in claim 9 wherein the first frequency is 1 kHz and the second frequency is 32.768 kHz.

16. The integrated circuit product as recited in claim 9 wherein the fractional counter is an error counter and the second clock signal is configured to have an active level in response to the fractional count being in a range around a predetermined value.

17. An apparatus comprising:
- means for maintaining a low frequency count value at a fixed value in a low power mode and updating the low frequency count value in an active mode using a fractional count, an integral count, a first clock signal, and a second clock signal,
- wherein in the active mode, the low frequency count value is updated at a rate equal to a first frequency, the second clock signal is based on the fractional count and the first clock signal, and the second clock signal causes the integral count to increment at an average rate equal to the first frequency, and
- wherein the first clock signal has a second frequency, the first frequency being lower than the second frequency, and the second frequency being non-integrally related to the first frequency.

18. The apparatus as recited in claim 17 wherein the means for maintaining the low frequency count value at the fixed value in the low power mode and updating the low frequency count value in the active mode includes means for adjusting the low frequency count value in response to exiting the low power mode and based on a difference between a current value of a real time clock counter and a prior value of the real time clock counter stored upon entry into the low power mode.

* * * * *

UNITED STATES PATENT AND TRADEMARK OFFICE
CERTIFICATE OF CORRECTION

| | | |
|---|---|---|
| PATENT NO. | : 12,436,592 B2 | Page 1 of 1 |
| APPLICATION NO. | : 18/321058 | |
| DATED | : October 7, 2025 | |
| INVENTOR(S) | : Subrata Roy | |

It is certified that error appears in the above-identified patent and that said Letters Patent is hereby corrected as shown below:

In the Specification

In Column 6, Line 7, please replace "fractionalintegral" with --integral--.

Signed and Sealed this
Eighteenth Day of November, 2025

John A. Squires
*Director of the United States Patent and Trademark Office*